UNITED STATES PATENT OFFICE.

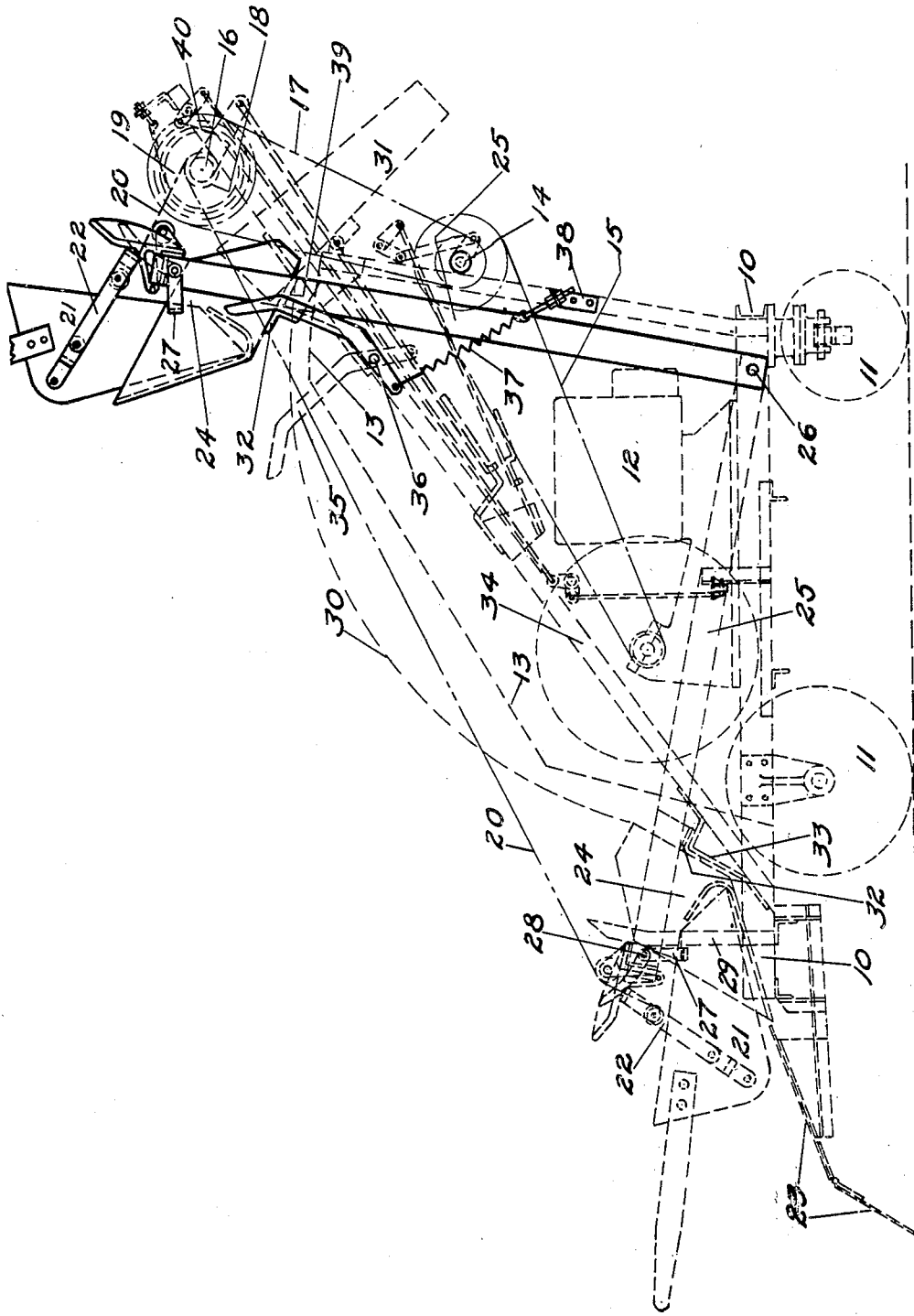

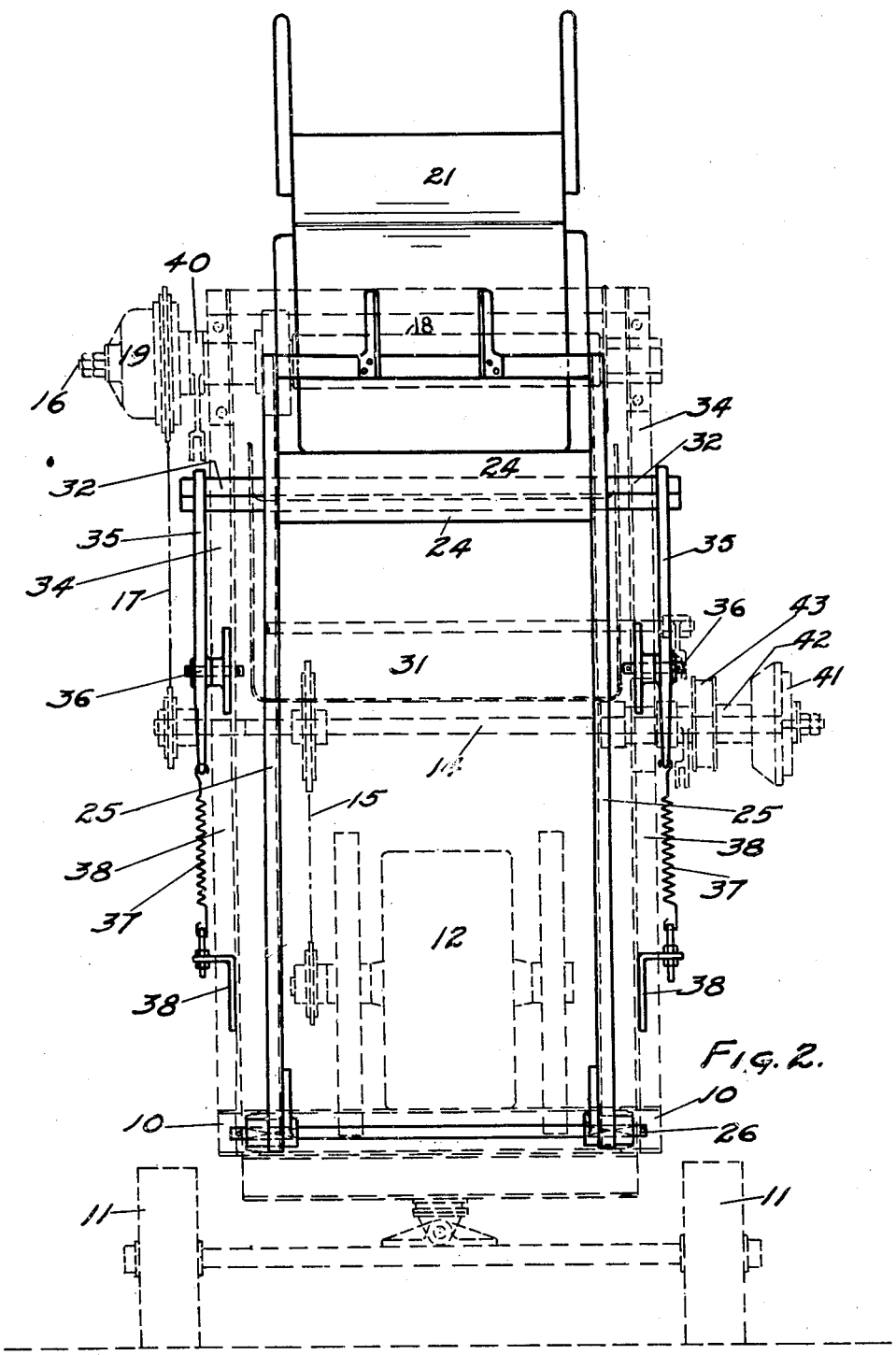

JOHN H. ALBRECHT, OF MADISON, WISCONSIN, ASSIGNOR TO THE T. L. SMITH COMPANY, OF MILWAUKEE, WISCONSIN, A CORPORATION OF WISCONSIN.

EXCAVATOR.

1,309,054.   Specification of Letters Patent.   Patented July 8, 1919.

Application filed December 6, 1916. Serial No. 135,288.

*To all whom it may concern:*

Be it known that I, JOHN H. ALBRECHT, a citizen of the United States, residing at Madison, in the county of Dane and State of Wisconsin, have invented certain new and useful Improvements in Excavators, of which the following is a specification.

My present invention pertains to improved excavators and loaders, the construction and advantages of which will be hereinafter set forth, reference being had to the annexed drawings, wherein:

Figure 1 shows a side elevation of my complete excavator and loader, and

Fig. 2 shows an end elevation of the machine viewed from the right hand end of Fig. 1.

The object of my invention is to provide an apparatus by means of which earth or other material may be dug or excavated by a scoop or scraper operated by mechanical power and said scoopful of material then loaded into a wagon or other receptacle, also by mechanical power, in one continuous operation.

The main frame 10 of the machine is supported on truck wheels 11 to render the device portable. 12 is the gasolene engine or other source of power, covered by the housing 13. Power is transmitted from the engine 12 to jack shaft 14 by the chain 15, and thence to the hoisting shaft 16 by the chain 17. Shaft 16 carries a drum 18 intermittently operated by a clutch contained in 19 and the hauling and hoisting cable 20 is wound on drum 18, being connected at its other end to the scoop or scraper 21 by means of the pivoted bail 22.

In Fig. 1 the scraper 21 is shown in two positions. Its lower position shown in dotted lines is that in which it arrives on the machine with its load of earth in its excursion from the excavation. Its upper position shown in full lines is the discharging position. In arriving on the machine, the scraper first traverses the threshold 23, and the nose of the scraper enters the skip 24 which is carried by radius arms 25, one on each side of the machine, which arms are pivoted to the frame 10 by the shaft 26. When in their lower position, the arms 25 and skip 24 are locked to the frame 10 by dogs 27 pivoted to the arms by shaft 28, and engaging under projections on the bars 29 which are fast to the frame 10. Tripping fingers, rigid on shaft 28, are engaged by the bail 22 of the scraper as it enters the skip and by their movement the dogs 27 are disengaged from the bars 29, and by the continued pull of cable 20, the scraper, radius arms and skip all swing into their upper position, the discharge tip of the skip 24 traveling in the arc 30. This part of my machine is set forth in detail in prior Patent 765,951 and need not be here accurately described in detail. As the skip arrives in upper position, the earth or other material is supposed to pour or run by gravity from the scraper through the skip 24 and discharge spout 31 into the wagon or other receptacle into which the material is to be loaded. There is no difficulty about discharging dry and granular material such as gravel, but in case the machine is working in wet sticky material such as wet clay, difficulty is experienced in starting the material out of the scraper.

To facilitate the discharge of wet sticky material I have added to the machine the following shaking device.

An angle bar 32 is attached to the skip 24 and to the radius arms 25. When the skip is in lower position, 32 engages stop 33 on the inclined frame bar 34. A stop similar to 33 and near the upper end of 34 is engaged by 32 in its upper position. This stop is numbered 39. These two stops limit the movement of 32 and consequently of the skip, at each end of its travel. Levers 35, one on each side of the machine, are pivoted on the bars 34 by the pins 36. Springs 37 are attached to the lower ends of these levers and to the frame bars 38. As levers 35 project into the line of travel of the angle bars 32 of the skip when nearing its upper position, the levers are tilted forward and springs 37 are extended and put in tension. The continued movement of the skip brings the bars 32 against the stops 39 tending to jar the material out of the scraper and skip. As the friction clutch 19 is released by the operator, the contraction of springs 37 throw the skip backward unwinding a little of the cable 20 from the drum 18. If the load has not been shaken loose, the operator reëngages the clutch 19 and bumps the skip again, repeating this operation until the load is dislodged.

After the load is discharged the springs 37 start the skip on its downward travel, and the speed of this travel is governed by a brake 40 on the drum 18.

On the jack shaft 14 there is located a friction clutch 41 operating the drum 42 and a controlling brake 43. These are for the purpose of operating a cable which passes from the drum 42 over a snatch block staked to the ground in the rear of where the digging or excavating is to be done, and finally attached to the rear end of the scraper. By means of this cable the scraper is pulled backward into position for re-loading.

Having now described my invention what I claim is:

In a loading machine, the combination, with a relatively fixed frame, of a swinging frame pivotally mounted thereon, a skip, means for directly connecting said skip to said swinging frame to be moved with the latter, a scraper adapted to be carried by said skip, means for swinging said frame from a position to receive the scraper to a position to discharge the scraper, a fixed stop on the fixed frame, a stop carried by the skip engaging said fixed stop when the scraper is in discharging position to impart a direct jarring action to the scraper to discharge the material therefrom, levers mounted on said fixed frame and projecting into the path of the stop carried by the skip, and springs acting on said levers to return said swinging frame a short distance so that the scraper may be jarred again by contact between the above named stops.

Signed at Madison, Wis., this 25 day of November 1916, in the presence of two subscribing witnesses.

JOHN H. ALBRECHT.

Witnesses:
CATHARINE KALRATH,
J. J. MCMANAMY.